United States Patent [19]

Dillon

[11] Patent Number: 4,964,666
[45] Date of Patent: Oct. 23, 1990

[54] MOUNTING SYSTEM FOR SECURITY SHIELD IN POLICE VEHICLES

[75] Inventor: John A. Dillon, Ypsilanti, Mich.

[73] Assignee: Automotive Prototypes & Equipment, Ann Arbor, Mich.

[21] Appl. No.: 266,125

[22] Filed: Nov. 2, 1988

[51] Int. Cl.⁵ ............................................. B62D 33/04
[52] U.S. Cl. .................................................. 296/24.1
[58] Field of Search ............................... 296/24.1, 1.1

[56] References Cited

U.S. PATENT DOCUMENTS

| | | | |
|---|---|---|---|
| 2,865,670 | 12/1958 | Dunn | 296/24.1 |
| 3,190,686 | 6/1965 | Smiler | 296/24.1 |
| 3,190,687 | 6/1965 | Johnson | 296/24.1 |
| 3,441,309 | 4/1969 | Halstead | 296/24.1 |
| 3,667,801 | 6/1972 | Setina | 296/24.1 |
| 4,015,875 | 4/1977 | Setina | 296/24.1 |
| 4,035,014 | 7/1977 | Sellers | 296/24.1 |

*Primary Examiner*—Robert R. Song
*Attorney, Agent, or Firm*—Dykema Gossett

[57] ABSTRACT

The present invention is a security shield for vehicles such as police vehicles or taxis. The security shield includes a shield body constructed to extend for substantially the entire width of the vehicle from the roof to a position below the backrest of the front seat a pair of legs mounted on either side of the shield body disposed over a corresponding lateral frame member of the vehicle and an adjustment screw disposed in each leg for raising the shield body from the lateral frame member toward the roof of the vehicle. In the preferred embodiment each leg includes a tapped hole for accommodation of the corresponding adjustment screw and each adjustment screw includes a substantially conical end adapted for high friction contact with the floor of the vehicle. In a further feature of the preferred embodiment, each leg is mounted on the shield body in an overlapping fashion having an overlap extent selectable during installation to control the lateral dimension of the security shield.

20 Claims, 3 Drawing Sheets

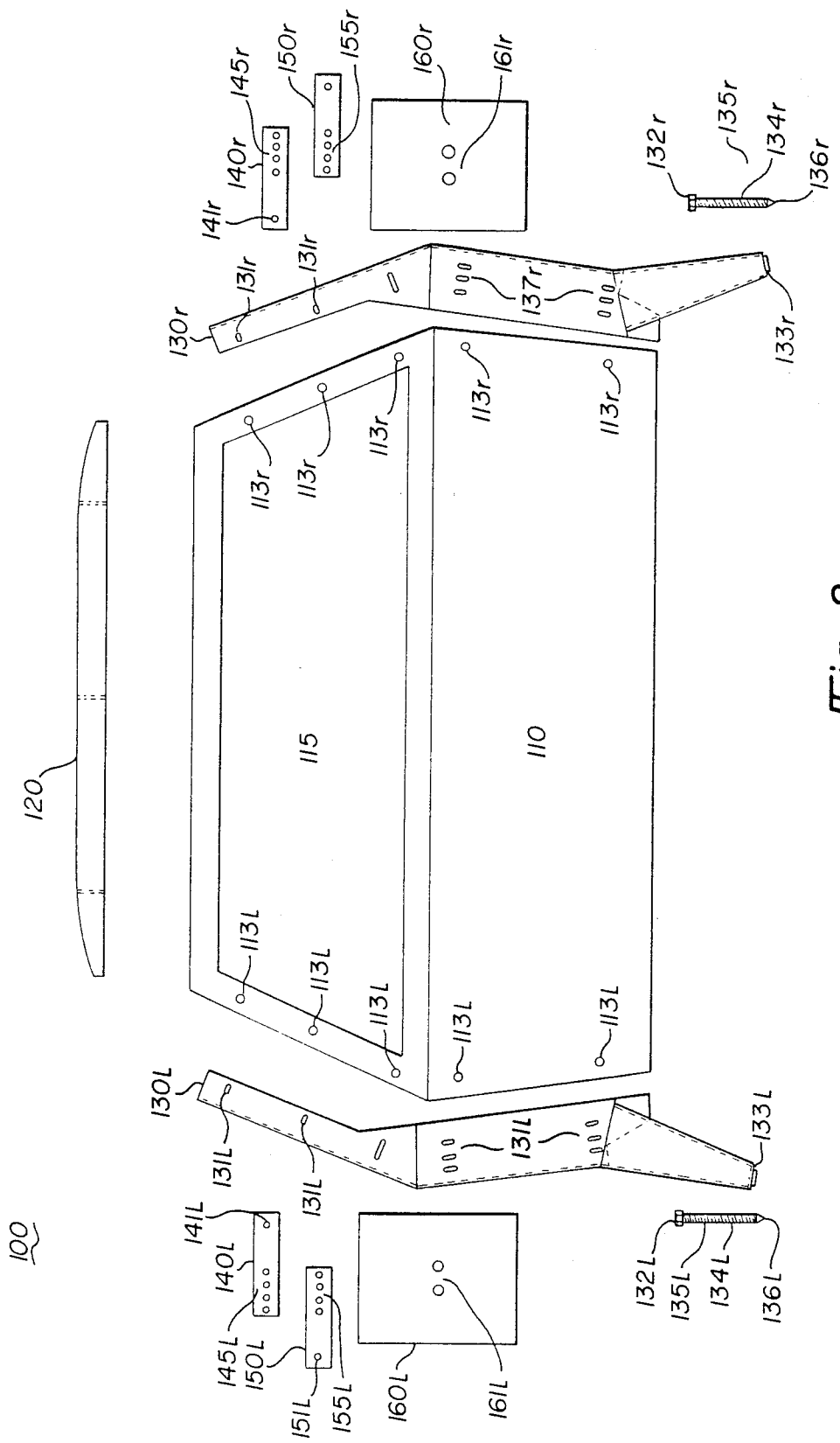

MOUNTING SYSTEM FOR SECURITY SHIELD IN POLICE VEHICLES

TECHNICAL FIELD OF THE INVENTION

The technical field of the present invention is that of security shield for use in vehicles, such as typically employed in police vehicles, which prevents rear seat occupants from having access to the front portion of the vehicle.

BACKGROUND OF THE INVENTION

It is known to employ partitions or shields in automobiles to prevent persons occupying the rear seat of the vehicle from unauthorized access to the front seat. Such systems are universally employed in police vehicles and also widely employed in taxicabs. When employed in police vehicles, such security shields prevent prisoners being transported in the police vehicle from interfering with the operation of the vehicle or from attacking the police officer or officers in the front seat of the vehicle. When employed in taxis, such security shields typically serve as a theft deterrent, protecting the taxicab driver from theft of cash received from previous fares.

A typical security shield of this type is designed to fit behind the front seat of the vehicle. Such a security shield will typically extend substantially the entire width of the vehicle from the roof of the vehicle to a point below the front seat back. Depending upon the construction of the vehicle, and in particular whether the vehicle includes a front bench seat or front bucket seats, such security shields must extend differing distances down from the roof of the vehicle. In addition the security shield must be sufficiently secured to the vehicle to prevent its removal or displacement by a determined assailant. Typically the upper portion of such security shields will have one or more transparent or semitransparent panels. This could be either a fixed transparent sheet, a transparent sheet in more than one section including one section which may slide to permit access, or may include a wire mesh. The purpose of these transparent panels in accordance with the prior art is to permit visibility from the front seat of the vehicle into the rear seat, without seriously compromising security.

The security shields of the prior art typically include a central shield section supported by a pair of legs on either side of the vehicle. In the typical installation, a right angle mounting bracket must be bolted to the floor to accommodate the leg of the security shield. This right angle mounting bracket typically mounts between the lateral frame member and the bottom of the floor well. This mounting bracket is typically installed by drilling a first set of holes horizontally into the lateral frame member and a second set of holes in the floor pan of the vehicle and securing the right angle mounting bracket via large lag bolts. It is typical to accommodate a standard size shield body to a number of differing vehicle models by a series of adapters. A height adaptor selected from a set of height adapters is inserted between the mounting bracket and the leg of the shield to accommodate the varying heights from the floor to ceiling of differing vehicle models. It is also typical to mount varying sizes of side members to the legs of the shield to adjust for the differing interior widths of various vehicle models.

The prior art construction technique for accommodating the standard security shield to a variety of vehicle models involves several problems. Firstly, the mounting of the right angle mounting bracket has several disadvantages. As noted above, this right angle mounting bracket is typically mounted via large lag bolts into holes drilled into the vehicle. The drilling of such holes is a hazardous operation. Typically this drilling will occur into the lateral frame member of the vehicle and in the floor pan of the vehicle. In many such vehicles a large electrical cable is encompassed in the lateral frame member. This is particularly true in the case of police vehicles which involve a much greater variety of electrical equipment than other vehicles. The drilling of the holes into this lateral frame member involves a risk of damage to this cable assembly. Because of the large number of wires included in such a cable assembly, it is a very tedious and difficult operation to repair such a cable. The drilling of holes in the vehicle frame and footwell is a further risk due to the proximity of the exhaust system. Holes that violate the vehicle integrity are liable to permit untreated exhaust gas to enter the passenger compartment of the vehicle putting the passengers and police officers at risk. In addition, it may be necessary to replace portions of the vehicle sheet metal damaged by this drilling process. It is known that a damaged or faulty catalytic converter will produce lethal gases capable of penetrating the vehicle interior should any holes be produced in the bottom sheet metal.

In addition to the possibility of accidental extraordinary damage to the vehicle as noted above, this mounting system also necessarily involves a degree of damage to the vehicle. In the typical police vehicle fleet operation, police vehicles are employed for several years and then retired from service. Upon retirement from police service, these vehicles are sold on the used car market to recover some of the initial cost of purchase. The specialized police equipment, including the security shield is removed from each vehicle upon retirement from police service. Even so, the damage to the vehicle necessitated by the prior art installation of the security shield reduces the resale value of the vehicle. This reduction in resale value increases the cost of fleet operation.

The prior art system for mounting security shields in vehicles also involve s a further disadvantage. As noted above, the installation typically requires the use of assorted adapters to accommodate the varying dimensions of differing vehicle models. It is typical for a single police fleet to employ more than one vehicle model and therefore require differing adapters for these differing vehicle models. Because the typical large police fleet will be constantly retiring and replacing vehicles, the management of the installation of the security shields requires an inventory of various adapters for the differing vehicle models in the police fleet. Additional expense is required to store and maintain such a variety of adapters and there remains the risk that the proper adaptor may not be on hand when a security shield installation is required. Thus this type of mounting system requires a relatively large expenditure of labor.

There is therefore a need in the art to provide a security shield for vehicles which is easy to install, easy to remOve, which does not require the extensive use of adapters for particular models of the vehicle and which provides a minimum amount of damage to the vehicle.

SUMMARY OF THE INVENTION

In accordance with the preferred embodiment of the present invention the security shield comprises a shield body constructed to extend for substantially the entire width of the vehicle from the roof of the vehicle to a position below the backrest of the front seat of the vehicle. This lower position is such that access from the rear seats to the front seat is blocked. The security shield further includes a pair of legs, one mounted on each side of the shield body. Each leg has a foot which accommodates an adjustment screw. Upon installation of the security shield into the vehicle, the pair of legs are positioned to place the adjustment screw over a corresponding lateral frame member in the vehicle. It has been found that virtually all vehicles employed in police service, whether constructed with an actual frame or with a unibody frame, will have a frame member at this location. The security shield is held in place primarily by extending the adjustment screws in the legs thus pinning the security shield between the lateral frame members and the ceiling. Additional lateral stability is provided by a pair of side arms which attach to the door pillar. In accordance with the preferred embodiment, each side arm is attached at the shoulder harness pivot bolt.

This construction involves several improvements over the security shields of the prior art. Firstly, there is very little potential for extraordinary, expensive damage to the vehicle during installation. Secondly, the amount of ordinary damage to the vehicle is low, resulting in greater resale value of the vehicle upon retirement from police service. The installation and de-installation process is rapid when compared to the prior art, thereby saving labor cost. Lastly, the security shield of the present invention is constructed to be applicable to a wide variety of vehicle models without the need to stock numerous adapters.

BRIEF DESCRIPTION OF THE DRAWINGS

These and other objects and aspects of the present invention will become clear from the following description of the invention taken together with the drawings, in which:

FIG. 2 is an exploded view of the various parts of the security shield of the present invention;

DETAILED DESCRIPTION OF THE PREFERRED EMBODIMENT

Figure 1:
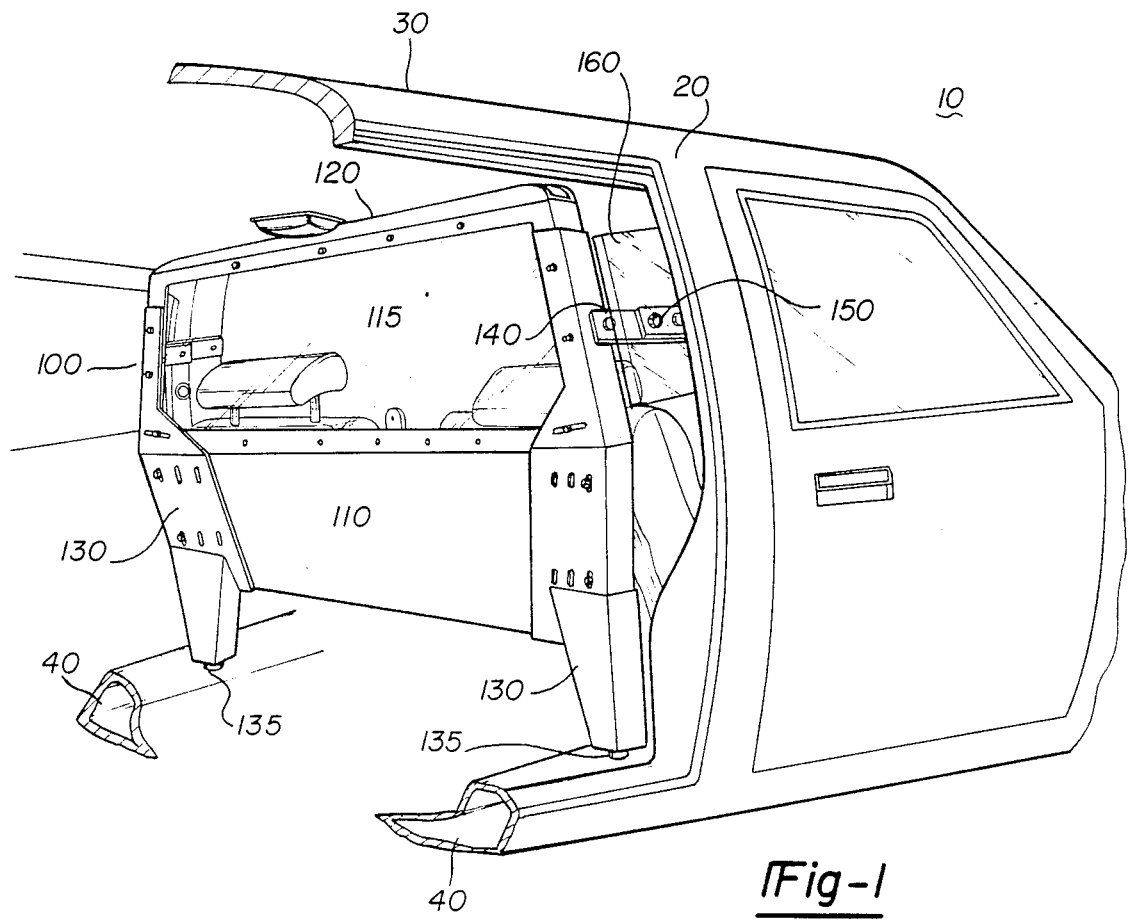
FIG. 1 is a partial cut away view of the security shield of the present invention in a typical installation.

FIG. 1 illustrates in a partial cut away view the security shield 100 of the present invention installed in vehicle 10. Vehicle 10 would typically be a police vehicle or taxi. Vehicle 10 includes door pillars 20, roof 30 and lateral frame members 40. Security shield 100 is installed between the front and rear seats of vehicle 10 to provide security to occupants of the front seat.

Security shield 100 includes body 100, window 115, top cap 120, legs 130, a pair of side arms consisting of aft side arm 140 and forward side arm 150, and side shield 160. Security shield 100 is constructed to substantially fill the space behind the front seat of vehicle 10 in lateral dimension and from a position below the knee level to the ceiling. As illustrated in FIG. 1, legs 130 rest on respective lateral frame members 40 holding the security shield 100 with top cap 120 firmly pressed against the ceiling of vehicle 10. Each leg 130 is attached to a corresponding door pillar 20 for lateral support via the side arm consisting of aft side arm 140 and forward side arm 150. The transparent side shield 160 provides additional security at the sides of security shield 100. The shield body 110, when installed, substantially fills the space behind the front seat of vehicle 10.

The construction of the present invention is further illustrated in an exploded view in FIG. 2. For the sake of clarity various conventional bolts employed to couple the structure of the security shield 100 are not illustrated in FIG. 2. Those skilled in the art would understand the manner of bolting various parts of security shield 100 without detailed description.

Shield body 110 is preferably constructed in the shape shown of 11-gauge cold rolled steel. As more clearly illustrated in FIGS. 1, shield body 110 preferably has a depth of approximately two inches. A box-like configuration is achieved by a folded weld construction. The shield body 110 preferably has a lateral dimension of approximately 55.45 inches and a height from top to bottom of approximately 30 inches. As more clearly illustrated in FIGS. 1 and 3, shield body 110 includes a bend below the bottom of window 115 in order to accommodate the shape of the rear of the front seat of vehicle 10. Construction in this manner provides an extremely strong structure.

The shield body 100 includes window 115 to permit visibility into the rear seat of vehicle 10 from the front seat without compromising security. There are numerous combinations known in the prior art to perform this function. Firstly, window 115 may be filled with a solid sheet of transparent polycarbonate plastic of sufficient thickness to prevent damage from the rear seat. Alternatively, window 115 may be composed of a wire mesh with holes small enough to prevent finger access. In addition, it is known in the art to provide a sliding door in this window 115 either of transparent material or of a metal wire mesh. The exact construction to be employed in any particular installation is a design choice known in the art and will not be further discussed in this application.

Shield body 110 includes numerous bolt holes 113r and 113l. These bolt holes 113r and 113l are employed for attachment of the respective right and left legs.

A top cap 120 is constructed for attachment directly to the upper portion of shield body 110. This top cap 120 is preferably formed of a synthetic rubber material having high resiliency and enabling a high friction contact to the ceiling of the vehicle.

FIG. 2 illustrates right leg 130r and left leg 130l. Right leg 130r includes a set of upper bolt holes 131r, a set of lower bolt holes 137r and a foot 133r. Likewise, left leg 130l includes bolt holes 130l, bolt holes 137l and a foot 133l. The right leg 130r is attached to shield body 110 via bolt holes 113r, 131r and 137r in a manner that will be more fully disclosed below. Left leg 130l is likewise attached to the left portion of shield body 110 via bolt holes 113l, 131l and 137l. The bolts for attachment of the respective legs to the sides of the shield body are not illustrated in FIG. 2 for the purpose of clarity. However, it is well known to attach parts in this manner. In accordance with the preferred embodiment of the present invention each of the right and left legs are constructed of similar 11-gauge cold rolled steel of a folded weld construction.

Adjustment screw 135r is constructed to engage an internal nut in foot 133r of leg 130r. Similarly, an adjustment screw 135l mates with a nut inserted within foot 133l. Each adjustment screw 135r includes a hexagonal head 132r, a threaded portion 134r and a conical tapered end 136. The left adjustment screw 135l is similarly constructed. In a manner that will be more fully disclosed below, height adjustment upon installation of the security shield 100 is effected by the selective extension of adjustment screws 135r and 135l.

Figure 3:
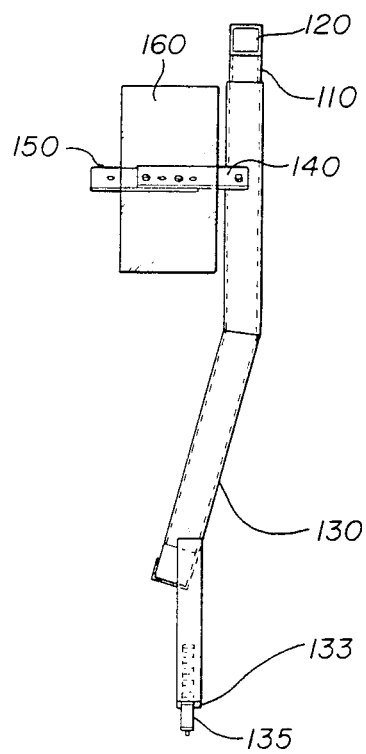
FIG. 3 is side view of the security shield of the present invention illustrating the side arm and transparent side shield.

Disposed on each leg 130 is a lateral support structure including aft side arm 140, forward side arm 150 and side shield 160. Aft side arm 140 includes a first bolt hole 141 by which this structure is attached to the outer portion of the corresponding leg 130. Aft side arm 140 includes a plurality of bolt holes 145 which enable attachment of this structure to forward side arm 150. Forward side arm 150 likewise includes a bolt hole 151 for attachment to the shoulder harness pivot bolt 60, and a set of bolt holes 155 for attachment to the aft side arm 140. A transparent side shield 160, preferably constructed of transparent polycarbonate plastic, is attached to this combination via bolt holes 161. A side view of the completed construction is illustrated in FIG. 3. Note that aft side member 140 is attached at one end to the leg 130. Aft side arm 140 and forward side arm 150 are overlapped to the extent necessary to provide the desired length and then coupled via a pair of bolts through selected bolt holes 145 and 155. This same pair of bolts are inserted through bolt holes 161 for attachment of the side shield 160. This structure provides additional lateral support for the security shield 110 enhancing the capability of retaining this security shield in its desired location. As illustrated in FIG. 3, side shield 160 extends substantially the entire width from leg 130 to the door pillar 20. Because the security shield 100 is stepwise adjustable in width, there may be a small mismatch between the width of security shield 100 and the interior width of vehicle 10. Side shield 160 provides additional security by blocking access around the side of security shield 100.

The security shield 100 of the present invention is installed in the following manner. Firstly, the shield body 110 is assembled with the desired configuration within window 115. As noted above, this window may take a variety of forms as desired. The top cap 120 is preferably bolted onto the top portion of shield body 110. Next the adjustment screws 135 are inserted within the captured nut 133 at the bottom of each leg 130. Initially the adjustment bolts 135 are extended a limited amount to enable the security shield to be installed within the vehicle.

Figure 4A:
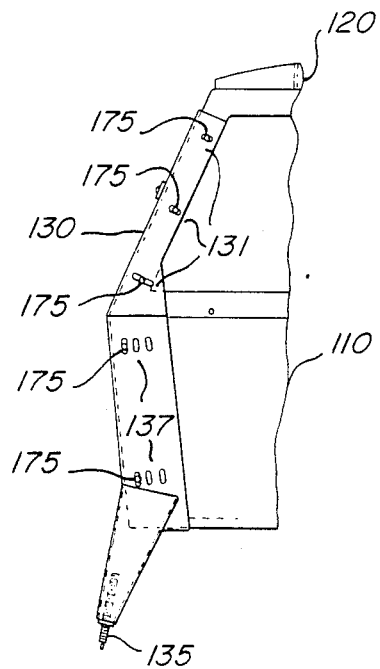
FIGS. 4a and 4b illustrate the manner of adjustment of the lateral dimension of the security shield of the present invention.
Figure 4B:
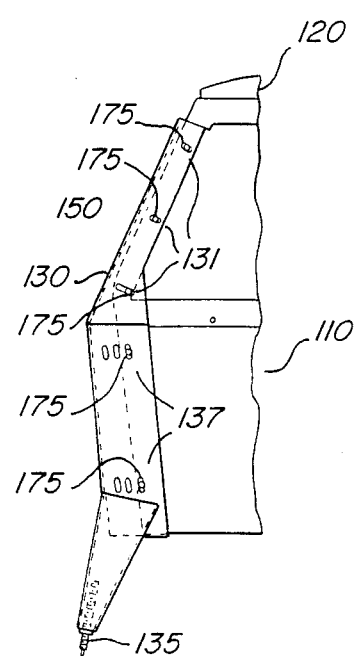

Next the legs 130 are attached to the shield body 110 in a manner providing the desired total width for security shield 100. This manner is illustrated in FIGS. 4a and 4b, which illustrate the attachment of the left leg 130l to the shield body 110. The right leg 130r is attached in a similar fashion. FIG. 4a illustrates the attachment of left leg 130l to shield body 110 with a maximum of overlap between the left leg 130l and shield body 110. This is achieved by employing the outermost holes 137 for attachment. Note that bolt holes 137 are elongated to some extent in order to provide some adjustment of width. Also note that the bolt holes 131 are similarly somewhat elongated in order to provide an adjustment of the width when the leg 130 is mounted by differing of the bolt holes 137. In contrast, FIG. 4b illustrates attachment of left leg 130l to shield body 110 with a minimum of overlap. This is achieved employing bolts 175 in the innermost bolt holes 137. An intermediate extension can be achieved by the use of the center bolt holes 137. In accordance with the preferred embodiment of the present invention the bolt holes 137 are disposed approximately one inch apart. This provides a two-inch width adjustment for each leg 130. Therefore, a total of four inches of width adjustment of the security shield 110 can be made by the selection of the point of attachment of the legs 130 to the shield body 110. The point of attachment of legs 130 is selected depending upon the interior width of the particular police vehicle 10 in order to provide the desired total width to the security shield 100.

The next step in installation of security shield 100 is removal of the shoulder harness pivot bolts. The shoulder harness pivot bolts are installed on the interior portion of door pillar 20, and serve as the pivot point for the shoulder harness which is reeled from a spool near the floor of the vehicle. After removal of this shoulder harness pivot bolt, the bolt hole 151 of the forward side member 150 is aligned with the bolt hole in door pillar 20. The shoulder harness pivot bolt is then replaced by threading through the shoulder harness pivot and through bolt hole 151 of the forward side arm 150. This permits lateral stabilization of the security shield 100 via this shoulder harness pivot bolt.

Figure 5:
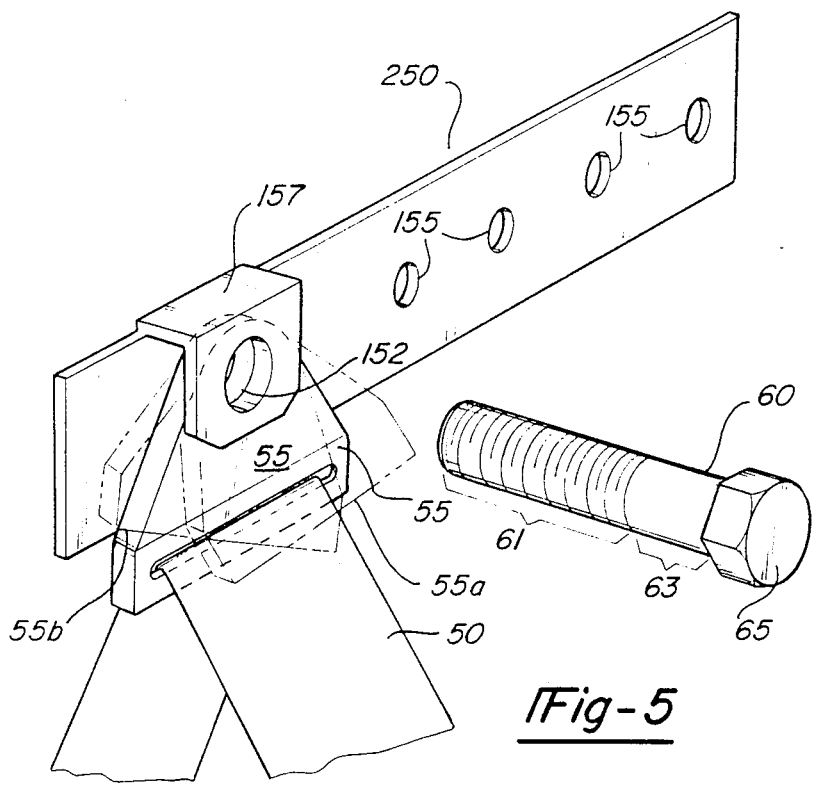
FIG. 5 illustrates a portion of a side arm in accordance with an alternative embodiment of the present invention.

An alternative construction for forward side arm 150 is illustrated in FIG. 5. The typical shoulder harness pivot bolt 60 employed in these vehicles is a shoulder bolt. This includes a threaded portion 61, an unthreaded shoulder portion 63 and a head 65. In a typical installation the unthreaded shoulder portion 63 is constructed having sufficient depth so that the shoulder harness pivot bolt 60 can be tightened to its maximum depth without pinching the shoulder harness pivot 55. This enables the shoulder harness pivot 55 and seatbelt 50 to freely pivot during attachment and removal of seatbelt 50. The provision of the extra thickness of the forward side arm 150 may enable shoulder harness pivot bolt 60 to be tightened sufficiently to pinch the shoulder harness pivot 55. The alternative forward side arm 250 illustrated in FIG. 5 eliminates this possibility. Alternative forward side arm 250 includes a pivot protector arm 157 which includes a second bolt hole 152. This pivot protector arm 157 is sufficiently long to provide an adequate space between the main body of forward side arm 150 and the parallel portion of pivot protector arm 157 to accommodate the shoulder harness pivot 55. The combination is assembled by passing shoulder harness pivot bolt 60 through bolt hole 152, through the bolt hole in shoulder harness pivot 55 and through the bolt hole 151 and thus into the bolt hole in door pillar 20. The pivot protector arm 157 prevents shoulder harness pivot bolt 60 from being tightened to the point of pinching the shoulder harness pivot 55. Thus shoulder harness pivot 55 is free to move between positions 55a and 55b illustrated in dashed lines in FIG. 5.

The next step in installation of the security shield 100 is attachment of the aft side arms 140. Each leg 130 has an aft side arm 140 attached in the manner illustrated in FIG. 3. The bolt attaching these parts is not tightened at this point, but is left loose to permit this aft side arm 140 to pivot.

The next step in installation of security shield 100 involves placing the partially assembled unit into position. The partially assembled security shield 100 is inserted through an open rear door. In most installations it will be possible to insert security shield 100 into the rear of vehicle 10 without removal of the rear seats. The conical ends 136 of each of the adjustment screws 135 are then preliminarily placed in position on frame members 140 of vehicle 10. The security shield 100 is then raised into a vertical position approximating the position of installation. As previously noted, the total width of security shield 100 has been adjusted by the manner of attachment of legs 130 in order to provide the desired width dependent upon the interior width of the vehicle 10. At this time any needed minor adjustments in the placement of the conical ends 136 of adjustment screws 135 are made to place the security shield 110 near its installed position.

The next step involves joining the aft side arms 140 with the forward side arms 150. This is achieved by matching bolt holes 145 with bolt holes 155 in a configuration providing the nearest approximation to the length desired. These two parts of the side arms are then attached with bolts in the manner previously described in conjunction with FIG. 3. If installed, the transparent side shield 160 is attached to the side arm using the same bolts.

The adjustment screws 135 are then extended employing the hexagonal heads 132. The configuration of leg 130 enables limited access to the heads 132 of adjustment screws 135 from the rear of the vehicle 10, however, it is possible to access these adjustment screws from the front seat. The adjustment screws 135 are extended until top cap 120 is firmly pressed into the ceiling of the vehicle 10. In some instances it has been discovered that it is necessary to establish a torque limit for the tightening of adjustment screws 135. The security shield structure 100 including adjustment screws 135 is so strong that overextending adjustment screws 135 may result in deformation of the roof 30 of the vehicle 10. Therefore, care is required to prevent this over extension. Provision of a torque limit for adjustment screws 135 will eliminate the possibility of warping the vehicle 10 during installation.

The final step of installation of security shield 100 involves tightening the bolts of the lateral arms. The bolts attaching the aft side arm 140 and the forward side arm 150 can now be tightened securely. Similarly, the bolt attaching the aft side ar 140 to leg 130 may also be tightened securely.

De-installation of security shield 100 happens in approximately the reverse order. Firstly, the bolts of the side arms are loosened to permit limited movement. Adjustment screws 135 are rotated to lower security shield 100 from the ceiling of vehicle 10. The side arms are then removed. The security shield 100 may then be removed from the vehicle via one of the rear doors. Lastly, the shoulder harness pivots are replaced using the original bolts.

The construction of the security shield of the present invention permits rapid installation and de-installation. An experienced crew can assemble the security shield and install it in a vehicle in well under fifteen minutes. De-installation is even more rapid.

It has been found that the security shield 100 constructed in accordance with the present invention provides a very strong security shield which is capable of withstanding substantial abuse without dislodging or deforming. In addition, the manner of construction of security shield 100 of the present invention permits rapid installation and de-installation. Lastly, the installation of security shield 100 in accordance with the present invention provides only a minor amount of damage to the vehicle. The only discernible damage is the impressions formed in the floor of the vehicle by the conical tips 136 of adjustment screws 135, and perhaps a impression in the ceiling of the vehicle caused by pressure from top cap 120. This damage to the vehicle 10 is exceptionally small in comparison to the damage caused by the prior art manner of construction. Lastly, the security shield 100 of the present invention can be installed in a variety of vehicles of differing sizes without requiring additional adaptor features.

I claim:

1. A security shield for vehicles having lateral frame members disposed beneath the floor on either side of the vehicle, comprising:
    a shield body constructed to extend for substantially the entire width of the vehicle from the roof to a position below the backrest of the front seat preventing access from the rear seat to the front seat; and
    a pair of legs, one of said legs mounted on either side of said shield body, each leg having a foot constructed to be disposed over a corresponding lateral frame member of the vehicle and arf adjustment screw disposed in said foot, said adjustment screw rotatable for extension from the corresponding leg to raise said shield body from the corresponding lateral frame member toward the roof of the vehicle;
    each of said pair of legs mounted on said shield body in an overlapping fashion having an overlap extent selectable during installation to control the lateral dimension of said security shield;
    said foot of each of said pair of legs includes a tapped hole for accommodation of said corresponding adjustment screw; and
    each of said adjustment screws includes a substantially conical end adapted for high friction contact with the floor of the vehicle and a means for facilitating rotation.

2. The security shield for vehicles as claimed in claim 1, wherein:
    said shield body includes a set of first bolt holes on either side thereof, each set of bolt holes for mounting the corresponding leg;
    said pair of legs each includes a plurality of sets of second bolt holes, each set of second bolt holes disposed to mate with said set of first bolt holes on a corresponding side of said shield body, said sets of second bolt holes disposed at differing lateral positions; and
    a pair of sets of bolts, each set of bolts for mounting one of said pair of legs on a corresponding side of the shield body via said corresponding set of first bolt holes and one of said sets of second bolt holes selected during installation thereby controlling the lateral dimension of said security shield.

3. The security shield for vehicles as claimed in claim 1, wherein the vehicle includes lateral roof pillars disposed between front and rear seats thereof, each roof pillar including a shoulder harness pivot bolt holding a shoulder harness guide, said security shield further comprising:

a pair of lateral support members, each having an elongated body attached at a first end thereof to a corresponding leg and attached at a second end thereof to a corresponding shoulder harness pivot bolt.

4. The security shield for vehicles as claimed in claim 3, wherein;

each of said lateral support members has a length adjustable during installation.

5. The security shield for vehicles as claimed in claim 4, wherein:

each of said lateral support members consists of
a rear lateral support member having a rearward end disposed on said corresponding leg and a forward end including a plurality of longitudinally disposed first bolt holes;
a forward lateral support member having a forward end disposed on the shoulder harness pivot bolt and a rearward end including a plurality of longitudinally disposed second bolt holes; and
at least one lateral fastening bolt for securing said forward end of said rear lateral support member to said rearward end of said forward lateral support member via corresponding first and second bolt holes selectable during installation, thereby selecting the length of said lateral support member.

6. The security shield for vehicles as claimed in claim 5, further comprising:

a pair of transparent lateral shield members, each mounted to a corresponding lateral support member via said at least one lateral fastening bolt and having dimensions to extend for substantially the entire width from the corresponding lateral roof pillar to said corresponding leg to prevent access from the rear seat to the front seat between said corresponding leg and the corresponding lateral roof pillar.

7. The security shield for vehicles as claimed in claim 3, wherein:

each of said pair of lateral support members includes
a first pivot bolt hole in said elongated body at the forward end thereof, and
a pivot protector arm having a central member substantially perpendicular to said elongated body and an end member substantially parallel to said elongated body including a second pivot bolt hole,
whereby said lateral support member is attached to the corresponding shoulder harness pivot bolt by threading the shoulder harness pivot bolt through said first and second pivot bolt holes and the shoulder harness guide, said central segment having a length to prevent the shoulder harness pivot bolt from being tightened sufficiently to pinch the shoulder harness guide.

8. The security shield for vehicles as claimed in claim 1, wherein:

said shield body includes a top cap on the upper portion thereof constructed of a material to provide resilient, high friction contact with the ceiling of the vehicle.

9. A security shield for vehicles having lateral frame members disposed beneath the floor on either side of the vehicle, comprising:

a shield body constructed to extend for substantially the entire width of the vehicle from the roof to a position below the backrest of the front seat preventing access from the rear seat to the front seat; and a pair of legs, one of said legs mounted on either side of said shield body, each leg having a foot constructed to be disposed over a corresponding lateral frame member of the vehicle and an adjustment screw disposed in said foot, said adjustment screw rotatable for extension from the corresponding leg to raise said shield body from the corresponding lateral frame member toward the roof of the vehicle;

each of said adjustment screws includes a substantially conical end adapted for high friction engagement with the floor of the vehicle.

10. The security shield for vehicles as claimed in claim 9, wherein:

said foot of each of said pair of legs includes a tapped hole for accommodation of said corresponding adjustment screw.

11. The security shield for vehicles as claimed in claim 9, wherein:

each of said pair of legs is mounted on said shield body in an overlapping fashion having an overlap extent selectable during installation to control the lateral dimension of said security shield.

12. The security shield for vehicles as claimed in claim 11, wherein:

said shield body includes a set of first bolt holes on either side thereof, each set of bolt holes for mounting the corresponding leg;
said pair of legs each includes a plurality of sets of second bolt holes, each set of second bolt holes disposed to mate with said set of first bolt holes on a corresponding side of said shield body, said sets of second bolt holes disposed at differing lateral positions; and
a pair of sets of bolts, each set of bolts for mounting one of said pair of legs on a corresponding side of the shield body via said corresponding set of first bolt holes and one of said sets of second bolt holes selected during installation thereby controlling the lateral dimension of said security shield.

13. The security shield for vehicles as claimed in claim 9, wherein the vehicle includes lateral roof pillars disposed between front and rear seats thereof, each roof pillar including a shoulder harness pivot bolt holding a shoulder harness guide, said security shield further comprising:

a pair of lateral support members, each having an elongated body attached at a first end thereof to a corresponding leg and attached at a second end thereof to a corresponding should harness pivot bolt.

14. A security shield for vehicles having lateral frame members disposed beneath the floor on either side of the vehicle and lateral roof pillars disposed between front and rear seats thereof, each roof pillar including a shoulder harness pivot bolt holding a shoulder harness guide, comprising:

a shield body constructed to extend for substantially the entire width of the vehicle from the roof to a position below the backrest of the front seat preventing access from the rear seat to the front seat; and a pair of legs, each of said pair legs mounted on said shield body in an overlapping fashion having an overlap extent selectable during installation to control the lateral dimension of said security shield;

a pair of lateral support members, each having an elongated body attached at a first end thereof to a corresponding leg and attached at a second end thereof to a corresponding shoulder harness pivot bolt.

15. The security shield for vehicles as claimed in claim 14, wherein:

said shield body includes a set of first bolt holes on either side thereof, each set of bolt holes for mounting the corresponding leg;

said pair of legs each includes a plurality of sets of second bolt holes, each set of second bolt holes disposed to mate with said set of first bolt holes on a corresponding side of said shield body, said sets of second bolt holes disposed at differing lateral positions; and a pair of sets of bolts, each set of bolts for mounting one of said pair of legs on a corresponding side of the shield body via said corresponding set of first bolt holes and one of said sets of second bolt holes selected during installation thereby controlling the lateral dimension of said security shield.

16. The security shield for vehicles of claim 14, wherein said pair of legs each have a foot constructed to be disposed over a corresponding lateral frame member of the vehicle and an adjustment screw disposed in said foot, said adjustment screw rotatable for extension from the corresponding leg to raise said shield body from the corresponding lateral frame member toward the roof of the vehicle.

17. The security shield for vehicles as claimed in claim 16, wherein each of said adjustment screws includes a substantially conical end adapted for high friction contact with the floor of the vehicle and a means for facilitating rotation.

18. A security shield for vehicles having lateral frame members disposed beneath the floor on either side of the vehicle, and lateral roof pillars disposed between front and rear seats thereof, each roof pillar including a shoulder harness pivot bolt holding a shoulder harness guide comprising:

a shield body constructed to extend for substantially the entire width of the vehicle from the roof to a position below the backrest of the front seat preventing access from the rear seat to the front seat; and a pair of legs, one of said legs mounted on either side of said shield body, each leg having a foot constructed to be disposed over a corresponding lateral frame member of the vehicle and an adjustment screw disposed in said foot, said adjustment screw rotatable for extension from the corresponding leg to raise said shield body from the corresponding lateral frame member toward the roof of the vehicle;

each of said pair of legs mounted on said shield body in an overlapping fashion having an overlap extent selectable during installation to control the lateral dimension of said security shield;

said foot of each of said pair of legs includes a tapped hole for accommodation of said corresponding adjustment screw; and each of said adjustment screws includes a substantially conical end adapted for high friction contact with the floor of the vehicle and a means for facilitating rotation;

a pair of lateral support members, each having an elongated body attached at a first end thereof to a corresponding leg and attached at a second end thereof to a corresponding shoulder harness pivot bolt.

19. The security shield for vehicles as claimed in claim 18 wherein:

each of said pair of lateral support members includes a first pivot bolt hole in said elongated body at the forward end thereof, and a pivot protector arm having a central member substantially perpendicular to said elongated body and an end member substantially parallel to said elongated body including a second pivot bolt hole;

whereby said lateral support member is attached to the corresponding shoulder harness pivot bolt by threading the shoulder harness pivot bolt through said first and second pivot bolt holes and the shoulder harness guide, said central segment having a length to prevent the shoulder harness pivot bolt from being tightened sufficiently to pinch the shoulder harness guide.

20. A security shield for vehicles, wherein the vehicle includes lateral roof pillars disposed between front and rear seats thereof, each roof pillar including a shoulder harness pivot bolt holding a shoulder harness guide, said security shield further comprising:

a pair of lateral support members, each having an elongated body attached at a first end thereof to a corresponding leg and attached at a second end thereof to a corresponding shoulder harness pivot bolt;

each of said pair of lateral support members including a first pivot bolt hole in said elongated body at the forward end thereof; and a pivot protector arm having a central member substantially perpendicular to said elongated body and an end member substantially parallel to said elongated body including a second pivot bolt hole;

whereby said lateral support member is attached to the corresponding shoulder harness pivot bolt by threading the shoulder harness pivot bolt through said first and second pivot bolt holes and the shoulder harness guide, said central segment having a length to prevent the shoulder harness pivot bolt from being tightened sufficiently to pinch the shoulder harness guide.

* * * * *